United States Patent Office 3,020,786
Patented Feb. 13, 1962

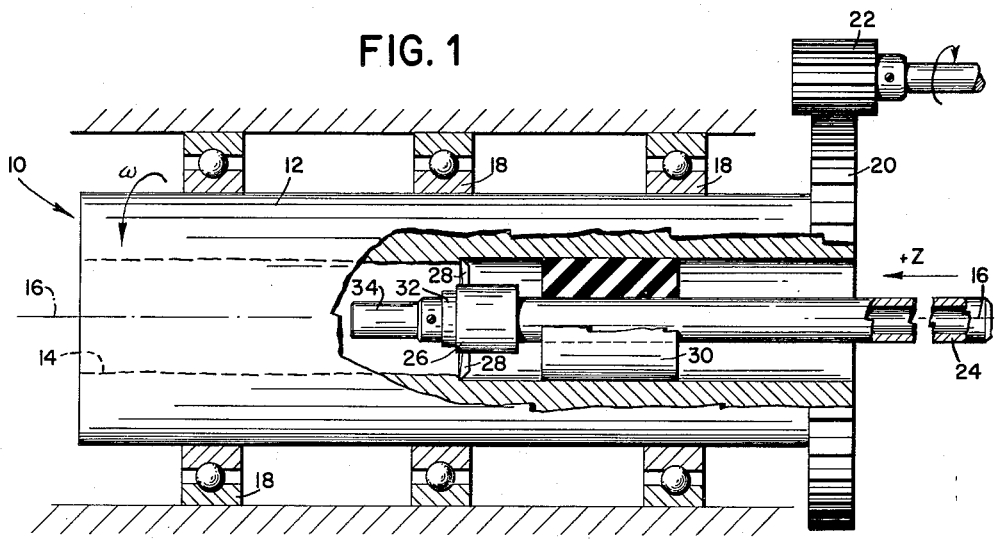
FIG. 1
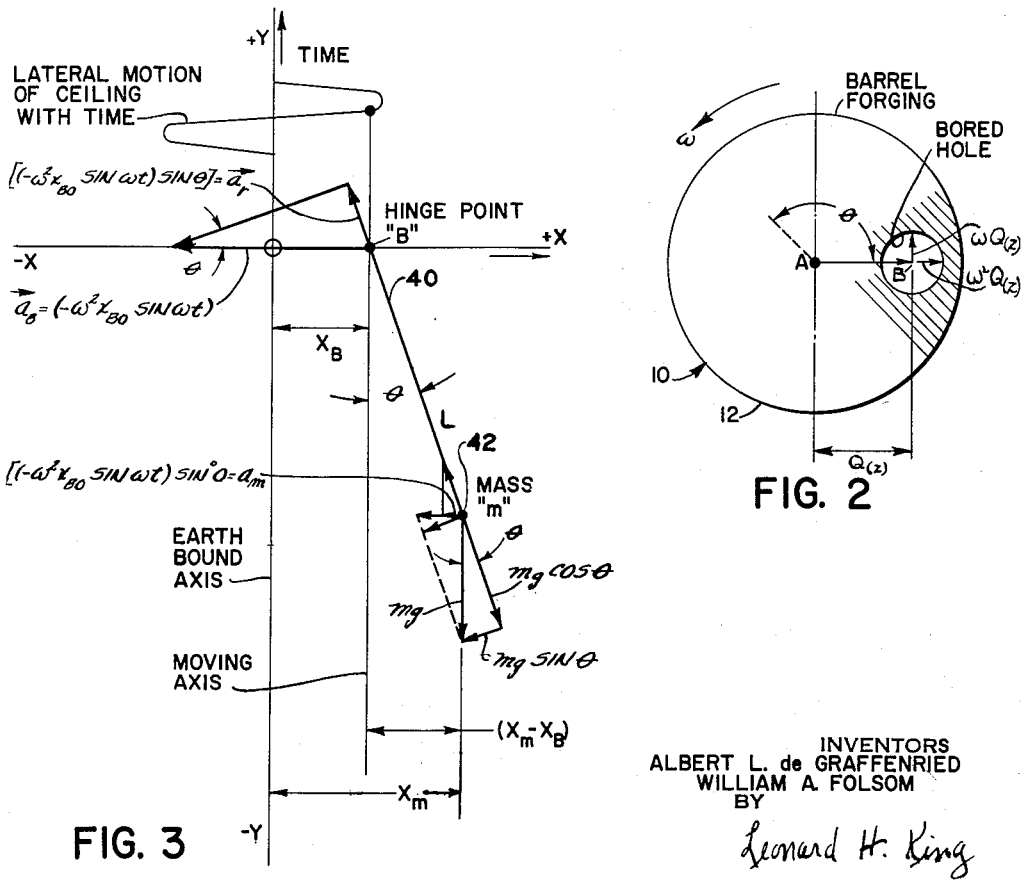
FIG. 2
FIG. 3
INVENTORS
ALBERT L. de GRAFFENRIED
WILLIAM A. FOLSOM
BY
Leonard H. King

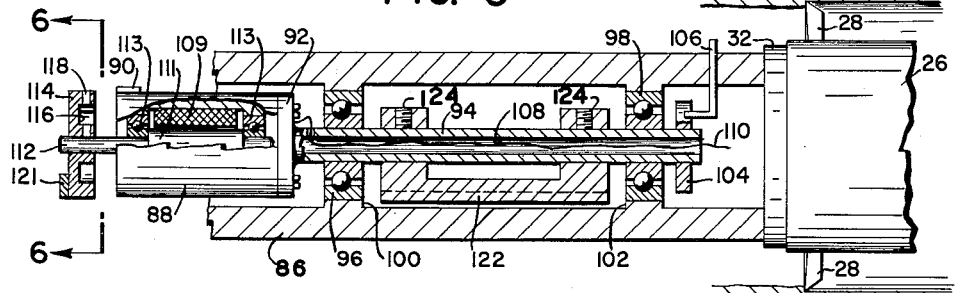
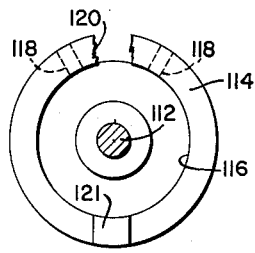
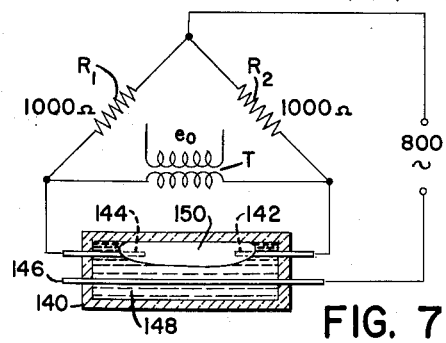
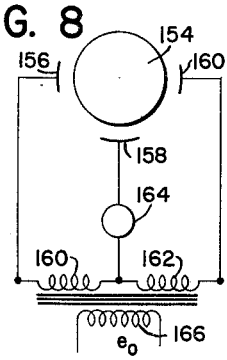
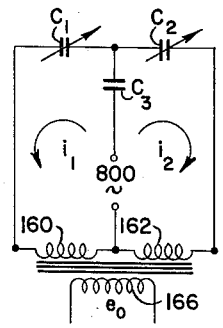
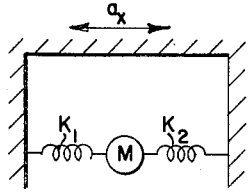

3,020,786
ELECTRONIC TOOL RUN-OUT INDICATOR FOR USE IN DEEP BORING OPERATIONS
Albert L. de Graffenried, 95 Glenwood Road, Roslyn Harbor, N.Y., and William A. Folsom, 10—07 Maryland Ave., Schenectady 8, N.Y.
Filed July 20, 1960, Ser. No. 44,066
22 Claims. (Cl. 77—3)

This invention relates to a device for improving the accuracy of machining operations and has particular reference to an electronic tool-run-out indicator for use in deep boring operations.

The manufacture of large or heavy cylindrical objects having a bore, such as gun barrels and the like, is generally accomplished by the production of a rough forging of the object followed by a machining operation for accurate finishing. For example, in the machining of a rough forged gun barrel, the barrel is first finished accurately on its outer cylindrical surface and is then made to rotate on centers. In boring the semi-finished forging, a boring tool is pushed slowly through the rotating work along the center line of rotation and experiences only axial translation. Frequently, the advance of the boring tool deeper into the gun barrel will be accompanied by a gradual stray of the boring tool from the center line of rotation and the center of the bored hole will no longer coincide with the center line of rotation. The center of the bored hole will be radially displaced from the center line of rotation. Therefore, the center of the bored hole and the tool in this hole will orbit the center line of rotation of the work. Such stray is particularly objectionable in the interior of the gun barrel where a high degree of accuracy is required. Stray, therefore, may effectively ruin an expensive forging.

Since the stray of the boring tool is a random phenomenon it is impossible to reliably produce gun barrels in desired quantities.

It is, therefore, an object of this invention to provide means for improving the accuracy of the boring operation in rotating objects.

It is a further object of this invention to provide a device for indicating the degree of boring tool run-out during the deep boring of rotating objects such as gun barrels and the like.

Still another object of this invention is to provide a run-out gauge for measuring run-out.

It is yet another object of this invention to produce an apparatus for indicating continuously the amount of run-out during a boring process and for producing an alarm whenever the run-out exceeds a maximum predetermined value which is considered allowable at any particular time or position in the boring process.

The invention contemplates the measurement of the radial displacement of the boring tool inside a rotating workpiece. Preferably, electrical means are employed which will sense one or more of the kinematic quantities resulting from such radial displacement and translate such quantities into an electrical signal. Means are further provided for generating an alarm signal when the electrical signal resulting from the displacement exceeds a predetermined value. As a feature of the invention, a rotary variable differential transformer having four terminals similar to an ordinary transformer is mounted on the boring tool and produces an output voltage directly proportional to the angle through which a rotary shaft is turned from a reference position on the frame.

For a more complete understanding of the invention, its other objects and advantages produced thereby, reference should be had to the following description and the accompanying drawings wherein preferred embodiments of the invention are described in detail and wherein the theory of operation is explained.

FIG. 1 is a perspective and somewhat diagrammatic showing of a device for boring the interior of a gun barrel wherein the boring tool includes a device which utilizes the principles of the invention.

FIG. 2 is a diagrammatic representation of the cross-section of a gun barrel (wherein a center hole is being bored) to illustrate the symbols and nomenclature to be used in connection with a discussion of the principles of this invention. The center hole is deliberately shown to be much further eccentric than would normally occur for purposes of clarity.

FIG. 3 is a vector diagram illustrating some of the principles of this invention.

FIG. 5 is a more detailed sectional view of the boring tool provided with a sensor utilizing the principles of this invention.

FIG. 6 is a side view of the pendulum of FIG. 5.

FIG. 7 is a somewhat schematic representation of another sensor which when used with the apparatus of the remaining figures embodies this invention.

FIG. 8 is a representation of another sensor which when used as described embodies this invention.

FIG. 9 is a schematic representation of an analog of FIG. 8.

FIG. 10 is an electrical circuit diagram of FIG. 8.

FIG. 11 is a representation of the output voltage produced by the circuit of FIG. 10.

Figure 4:
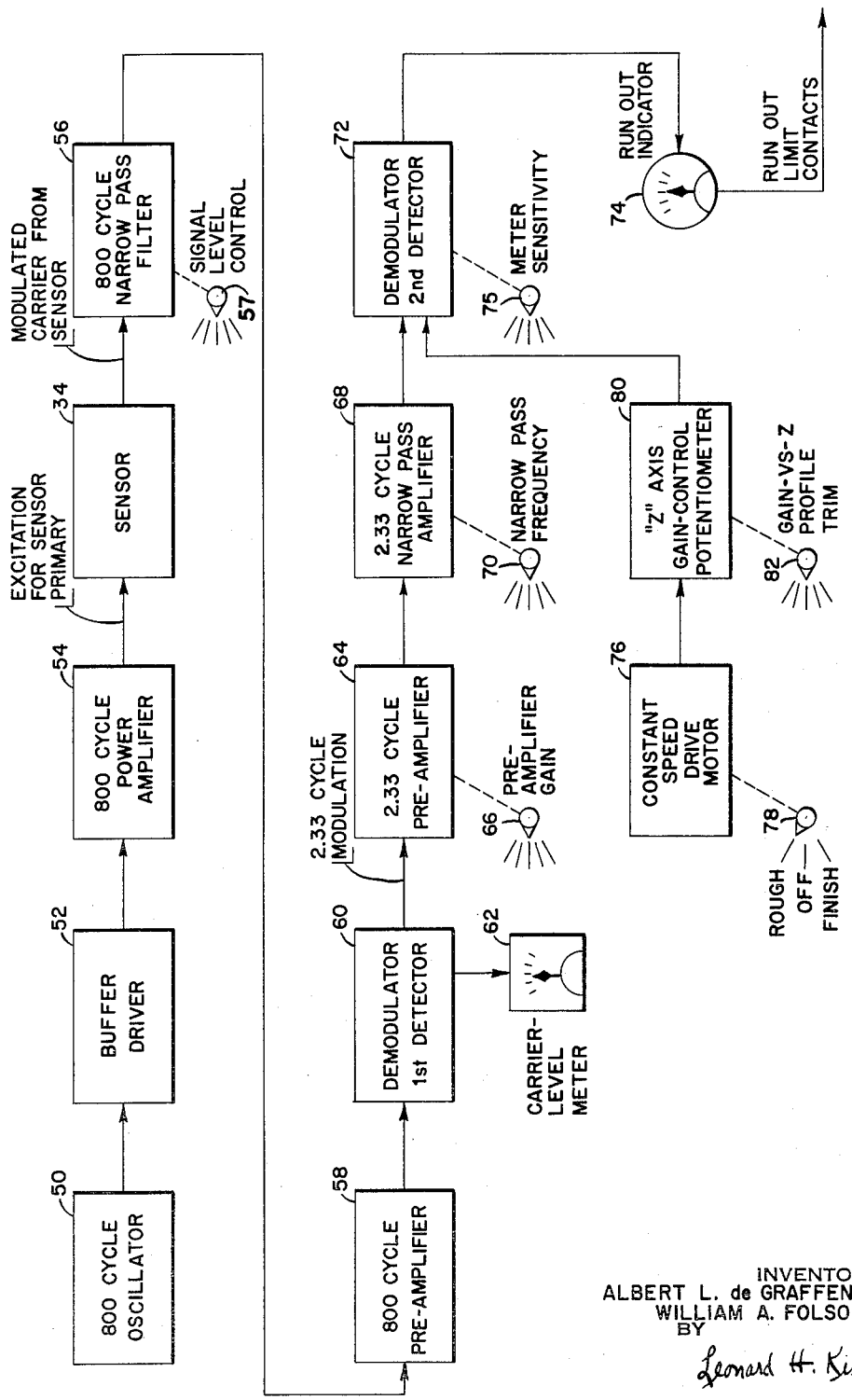
FIG. 4 is a block diagram of the electronic system for run-out detection all of which utilizes the principles of this invention.

Referring now to FIG. 1, a rough forged gun barrel 10 which has had its outer surface 12 accurately finished to desired dimensions and includes a rough forged hole 14 to be bored along a center line 16 is supported upon a plurality of rotatable ball or roller bearing supports which are designated 18. Each of these supports is shown only schematically but it will be understood by anyone familiar with the art that conventional means are provided to allow for rotation of the bearings and to adequately support the bearings. A barrel-turning ring gear 20 which is secured to the outside of the barrel 10 at one end thereof, by means of a shrink fit or other convenient means, is engaged by a driving pinion 22 which is connected to a motor (not shown) or other suitable driving means for the purpose of rotating the gun barrel upon its supports. It will of course be understood that it is the rotation of the barrel 10 which defines the center line 16. Preferably, the bearings 18 and the gear 20 co-operate to hold the barrel so that the outside surface at the barrel is concentric with the center line 16. Means (not shown) retain the axial position of the gun barrel. Such means may, for example, be ball or roller bearings engaging the ends of the gun barrel and are conventional in the art. The fit of ring gear 20 about the barrel serves to aid in prevention of axial movement of the barrel.

An axially movable tool-supporting boring bar projects from a support (not shown) into the hole 14 and terminates in a boring head 26 which securely supports a pair of conventional boring tool bits 28 which engage the rotating interior of the barrel 10. Conventional means advance the boring bar 24 toward the left as shown in FIG. 1 and prevent the rotation of the boring bar so that as the tool bits 28 cuttingly engage the interior hole 14, a hole is machined or bored out of the center of the barrel. A cylindrical neoprene rubber packing 30 is mounted upon the non-rotating bar 24 for axial movement therewith behind the boring head 26 to force the chips produced by the tool bits 28 in the forward direction. The packing, which is lubricated, has an uncompressed diameter slightly greater than the interior diameter of the machine bore. A mounting pedestal 32 secured to the boring head 28 is dimensioned to fit into the unbored rough forged hole and supports a tool run-out sensor 34.

The direction in which the boring head 26 and the boring bar 24 move, as well as the assemblies which traverse the interior of the barrel 10 along the center line 16, is designated for further description.

Referring to FIG. 2 which is an illustration of the cross-section of a barrel forging with a bored hole, the center of the bored hole is designated B and is purposely exaggerated well to the right of a center line A which is the center of rotation of the barrel. A center line A corresponds to the center line 16 in FIG. 1. The run-out as illustrated in FIG. 2 is defined as the distance from A to B; A vector, which is labeled in FIG. 2 $Q(z)$. This vector is shown as a function of $z$ since the run-out varies with the distance along the axis of the barrel. $z$ is zero at the powder chamber end of the barrel and increases positively in the direction toward the muzzle end. When the run-out $Q(z)$ is zero, the point B coincides with the point A and the bore is on center. However, upon the point B moving radially out from A, during rotation of the barrel, the point B will orbit around point A at a peripheral velocity of $$\vec{Q(z)} \times \vec{\omega} \text{ where } \vec{\omega}$$

is a vector along the axis of rotation and has a length proportional to the barrel rotational speed in radians per second. The last product is of course a vector cross product. The peripheral velocity is shown in FIG. 2 as an arrow rising directly upward from the point B.

As the point B orbits the center line A, the peripheral velocity vector steadily changes its direction. The amount of change of this vector in a time $\Delta t$ would be $$\vec{V} \times \vec{\Delta \theta}$$

The amount of change is designated $\Delta V$. $\theta$ is defined as the displacement of the vector from A to B at any point. Accordingly:

$$\vec{\Delta v} = \vec{v} \times \vec{\Delta \theta} = \vec{v} \times \vec{\omega} \Delta t$$

and substituting for $v$ we get $$\vec{\Delta v} = [Q(z) \times \omega] \times [\omega \Delta t]$$

Therefore:

$$\frac{\Delta V}{\Delta t} = \omega^2 Q(z)$$

which is readily recognized as the radial acceleration $a_r$ experienced by any particle riding on point B. This radial acceleration is a rotating vector like $Q(z)$. It can therefore be resolved into horizontal and vertical components representing acceleration of the tool center with respect to the center line of rotation 16. Hence:

$$\vec{a_r}(z,t) = a_r(z)[\cos \omega t + j \sin \omega t]$$

If only the horizontal component is considered, the point B experiences a sinusoidal displacement and a sinusoidal acceleration. Thus, to those skilled in the art of mechanical vibration, it will be obvious that when $\omega$ is constant, $Q(z)$ may be computed from a measurement of the horizontal acceleration by use of an accelerometer horizontally oriented or, $Q(z)$ may be measured directly by use of a modified seismic displacement-measuring pendulum suspended at B.

The nominal angular velocity of the gun barrel described in FIG. 1 is 140 r.p.m. Accordingly, the angular velocity $\omega$ is $4.66\pi$ radians per second, or $2\pi \times 2.33$ cycles per second.

Since the acceleration depends upon $\omega^2$ while displacement does not, and since $\omega$ is very low, it is most convenient to measure the displacement due to $\omega$ and run-out. A modified seismic pendulum is the prime mover of the sensor 1 in one embodiment of the invention.

An analysis for the behavior of the modified seismic pendulum is shown in FIG. 3 wherein the pendulum generally designated 40 is mounted within the sensor 34 at a hinge point B along the center line of the boring head 26. The hinge point B of course coincides with the point B of FIG. 2 and orbits about the point A of FIG. 1 when run-out exists. In FIG. 3, the point A is illustrated as the origin of a pair of Cartesion co-ordinate axes X and Y. The mass of the pendulum 40 is shown as concentrated at a mass concentration point 42 spaced from the hinge point by a constant distance L.

As is normal for a boring lathe, the speed of rotation of the gun barrel 10 is held essentially constant (for example, at 2.33 cycles per second), and the amplitude of the angle $\theta$ through which the pendulum arm L swings with respect to the vertical may readily be measured.

At any position of the concentrated mass 42 of the pendulum arm 40, the vertically downward force upon the pendulum mass is equal to $mg$ where $g$ is gravitational constant of the earth and $m$ is the magnitude of the mass. The force of the mass in the direction from the hinge point B to the position of the mass is shown by a vector which is equal to $mg \cos \theta$ where $\theta$ is the instantaneous angle made by the pendulum with respect to a vertical axis. A vector transverse to the pendulum is equal to $mg \sin \theta$. The horizontal distance of the mass concentration 42 from the axis through the center of rotation of the barrel is defined by $X_m$; the corresponding horizontal distance between the mass 42 and the hinge point is defined by $X_m - X_b$ where $X_b$ the amplitude of the horizontal component of the motion of the point B about the origin of the axis, i.e., A. The sinusoidal curve about the Y axis represents the lateral motion of the point B with respect to time. The natural frequency $\omega_n$ of the pendulum is determined by $$\sqrt{\frac{g}{L}}$$

where L is the distance from hinge point B to mass 42.

It can be shown that the operation of a pendulous mass suspended from a laterally moving point is very similar to the operation of a simple seismic mass suspended by a spring which is attached to a vertically moving upper suspension point which may be referred to as a ceiling. For a further discussion of this derivation, a person skilled in the art may derive additional information in the book, "Mechanical Vibrations" by Hartog, published by the McGraw Hill Co. in 1947, 3rd edition, on pages 60 and 61.

From this relationship it can be shown that $\theta \sim X_{Bo}$ where $X_{Bo}$ is the amplitude of the horizontal component of motion of the point B of FIG. 3.

The problem of measuring run-out is then resolved into a problem of mounting a modified seismic pendulum at the point B which corresponds to the center of the boring head 26 and that of measuring the amplitude of $\theta$, the angle through which the pendulum swings in response to the horizontal component of run-out displacement.

A suitable device which converts the angle $\theta$ to a proportional voltage is a rotary variable differential transformer produced by Lear, Inc. under the trade name, "Microsyn." This component has four terminals similar to an ordinary transformer. The output voltage of the transformer is directly proportional to the angle $\theta$ through which a rotor shaft in the transformer is turned from a reference position on the frame. If the primary terminals are excited with a steady alternating voltage of 800 cycles per second, for example, then the secondary terminals display an 800-cycle carrier which is modulated according to variations of the angle $\theta$. If the angle $\theta$ is subject to a low frequency sinusoidal motion, for example, 2.33 cycles, when the transformer and the pendulum are mounted upon the boring tool 26, the 800-cycle carrier will carry a sinusoidal modulation of 2.33 cycles of an amplitude proportional to $\theta$. Since $\theta$ is proportional to the horizontal component of run-out an electrical signal produces the information concerning the run-out magnitude.

Referring to FIG. 4, a block diagram comprised of a series of blocks each representing a conventional circuit illustrates the electronic equipment which is connected to the sensor which includes the Microsyn so as to provide for the sensor a carrier signal to be modulated. The equipment further separates electrically the modulation produced by the sensor from the carrier, rectifies the modulation, filters it, and presents the resulting D.C. on a meter as run-out. The apparatus of FIG. 4 further provides a means whereby the run-out is monitored continuously as the boring tool proceeds along the Z axis which is the longitudinal axis of the barrel and provides circuits such that if the run-out exceeds the maximum permissible run-out, an alarm will sound and summon the lathe operator.

In FIG. 4, a Wien bridge 800-cycle oscillator 50 impresses its output signal into a buffer stage 52. The buffer stage for buffer driver 52 acts as an impedance transformer by presenting a high impedance load to the oscillator and a low impedance generator for driving a power amplifier to isolate the oscillator from load variations. A final power amplifier 54 provides power gain and is matched to the load (the sensor primary) by an output transformer. The circuits for a Wien bridge oscillator may be found in the Department of the Army Technical Manual TM11–690, entitled "Basic Theory and Application of Transistors" published March 1959, which publication also illustrates power amplifiers. The buffer driver may, for example, be an emitter follower stage amplifier, also shown in the latter publication.

The sensor, which was previously designated 34, modulates the 800-cycle input with a frequency of approximately 2.33 cycles and produces a modulated carrier output.

An 800-cycle narrow pass filter 56 which includes a signal level control 57 is connected to the output of the sensor 34 and receives the modulated 800-cycle carrier and passes it first through a high-Q, series-type LC circuit tuned to 800 cycles. All modulation signals over 10 cycles per second are productive of side bands which exceed 810 or less than 790 cycles and are substantially attenuated by the circuit 56. The narrow-pass-filter signal is then rectified by a full-wave diode rectifier which acts as a first detector 60 after being passed through an 800 cycle preamplifier 58. The demodulator or first detector 60 includes a low-pass RC filter and drives a carrier level meter 62 to indicate the operation of the electronic system to this point in the circuit. The first detector 60 further serves to feed, by means of a 2.33 cycle pre-amplifier 64 having a pre-amplifier gain control 66, a 2.33 cycle narrow band-pass amplifier of the Wien bridge type which severely attenuate signals outside of 2.1 to 2.5 cycle band. The amplifier 68 is provided with an narrow pass frequency control 70. Narrow pass filters, pre-amplifiers, detectors and the like are conventional circuits which may be found in "Radio Engineering" by F. E. Terman, published by the McGraw Hill Co. in 1937.

A second half-wave diode detector 72, having an R-C network of a 10-second time constant serves to rectify the signal from the narrow pass amplifier and to remove ripple and deliver a smooth direct current to a run-out indicator 74. A meter sensitivity control 75 adjusts the demodulator or second detector 72.

A constant speed drive motor 76 having a rough-off finish control 78 includes a synchronous motor with gear reduction. The associated circuits permit this motor to be driven by a 60-cycle or 120-cycle alternating current giving a two-to-one speed multiplier. 60-cycles is a slow speed for use in rough finishing and the 120-cycle power is used during fast finish cuts. The drive motor 76 controls a Z-axis-gain-control-potentiometer 80 having a gain-vs.-Z profile trim 82 and including a three-turn potentiometer. The shaft of this potentiometer 80 is coupled to the output shaft of a gear reducton unit. This potentiometer is electrically loaded to give a non-linear taper. The potentiometer is used as a gain control between the second detector and the output of the 2.33-cycle narrow pass filter 68.

Upon a boring run being started the constant speed drive motor is turned on and the helipot shaft therein is rotated at a slow constant rate. This rate is proportional to the constant rate of advance of the boring bar along the barrel axis. Accordingly, the gain of the run-out indicator decreases with the advance of the boring tube in a manner such that full scale deflection on the run-out meter is always equal to the limit value of the run-out at each station. In such an arrangement a set of contacts are provided at the full scale position of the run-out meter and upon the occurrence at any Z position of a value of run-out in excess of the predetermined limit value which will drive the meter to full scale and close the contacts, a relay is closed. The contacts of the relay are used to actuate a summoning device such as a bell, horn, light, or the like. A run-out alarm delay (not shown) disables the alarm circuit until the boring bar has proceeded to a Z station where the limit value of run-out exceeds the maximum allowable error of measurement of the system.

It will of course be understood that the maximum allowable limit of run-out varies according to the position of the tool with respect to the length of the barrel; that is, there is a specific run-out for any Z position as the boring head 26 advances through the barrel.

Referring to FIG. 5, a sensor assembly, generally designated 34, is shown in more detail. The sensor is sealed within a high carbon steel cylinder 86 specially chosen to protect the sensor from gouging and abrasion of the cutting chips from the gun barrel. The cylinder 86 is mounted by means of a mounting pedestal 32 to the boring head 26 within the barrel 10. The Microsyn transformer 88 is surrounded by a lead sheath 90 and is attached to a face-plate-and-shaft assembly 92, 94, of which the shaft 94 is supported by two sets of ball bearings 96 and 98 mounted in axially spaced bulkheads 100, 102 within the cylinder 86. Angular travel limit cam 104 is keyed to the shaft 94 and is adapted to abut against adjustable limit stops such as 106. A hollow bore 108 axially extending through the shaft 94 provides a path for wires 110 extending from a stator 109 mounted in bearings 113 and a rotor 111 all in the interior of the transformer 88. A Microsyn rotor shaft 112 which forms part of the transformer 88 extends axially from the transformer and supports the torsional seismic pendulum 114 which is dis-shaped and includes an annular cut-out 116 and a plurality of radial holes 118 drilled in the pendulum periphery to create a desired unbalance. An unbalance weight 121 is mounted on the pendulum 116. The lead sheath 90 about the transformer frame 88 terminates at the upper portion thereof in a gap which is shown in FIG. 6 as 120. A rear pendulum 122 is keyed by means of screws 124 to the shaft 94.

The purpose of lead sheath surrounding the sensor frame is to torsionally isolate the Microsyn frame from the twistings of the boring head under cutting loads.

In operation now, the sensor is mounted upon the boring head, as shown in FIG. 1, and when the position of the boring head is such as to coincide with the center line of rotation of the rotating barrel little or no motion is imparted to the torsional seismic pendulum and no modulaion is applied to the output of the sensor signal of 800 cycles by motion of the pendulum.

Upon occurrence of run-out, the boring head, as well as the sensor 34, orbits about the center line of rotation of the rotating barrel 10 producing oscillation of the seismic pendulum 114 which serves to alter the coupling of the transformer 88 and modulate the 800-cycle output. The circuitry of FIG. 4 then produces a signal for actuating an alarm when the run-out exceeds a predetermined maximum for the particular position of the boring head 26 within the gun barrel as signaled by the potentiometer 80.

The barrel 10 is rotated at 2.33 cycles per second, and through the cutting teeth causes a torque on the boring bar about its longitudinal axis. This torque is erratic and random because the cutting forces are uneven, causing the boring bar 24 and sensor 34 to experience a continually varying torsional deflection, which may interfere with the results obtained from the Microsyn output.

If the boring bar 24 were infinitely stiff in torsion, then its torsional deflection would be zero, and it would be feasible to mount the Microsyn stator 109 directly upon the end of the boring bar 24. However, since the boring bar does actually twist, and the Microsyn frame is mounted directly upon the boring bar, it will twist (as the boring bar twists) with respect to the forward pendulum 114 causing the Microsyn to generate a signal based on twist instead of run-out. Since a signal so generated contains a 2.33 cycle component, it is impossible to distinguish this signal from the run-out signal.

Therefore, the transformer 88 is not mounted directly on boring head 26 but instead is torsionally isolated therefrom by suspending the Microsyn transformer on bearings 96, 98, using as previously stated, the shaft 94. A lead-loaded rear pendulum 122 mounted as shown adds torsional inertia to the system and establishes a reference torsional position for this assembly, since pendulum 122 always seeks the center of the earth.

Torsional isolation based on the above concept alone actually produces negligible torsional isolation, even with the finest bearings available and the maximum amount of lead loading on the pendulum. However, if the rear pendulum 122 is tuned substantially above 2.33 cycles per second, then another mechanism appears.

The erratic twisting of the boring bar 24, acting through bearings 96, 98, stimulates the rear pendulum assembly (122, 94, 92, 90 and 109) and causes it to continually oscillate (swing back and forth) at its natural frequency, 4.1 cycles in this case. This causes the balls of bearings 96, 98 to be in rapid motion about 95 percent of the time; therefore, the bearings 96, 98 are predominantly in a dynamic friction regime rather than in the static friction regime. Consequently, the torque transmitted by these bearings is an order of magnitude lower than for the static case. As a result, no 2.33 cycle component of torque ever reaches the stator 109.

During run-out conditions, the rear pendulum responds moderately to the 2.33 run-out stimulus. Due to the 4.1 cycle oscillation of the assembly 122, 109, 90, 94, the Microsyn bearings 113 are also in the dynamic friction regime 95 percent of the time. Forward pendulum 114 therefore also responds moderately to the run-out stimulus. Since it is tuned below the run-out frequency of 2.33, its response to 2.33 cycles will be of opposite phase to that of the rear pendulum assembly 122, 90. The resultant signal is therefore the sum of the two motions.

Any signals at 1.1 or 4.1 cycles are completely rejected by the electronic circuits of FIG. 4 which allow only the 2.33 cycle modulation to reach the run-out meter 74.

Without the continuous swinging back and forth of the rear pendulum at 4.1 cycles, it would be impossible to achieve adequate torsional isolation in the small volume available using mechanical means.

Referring to FIG. 7, there is shown a gravity sensing electrolytic potentiometer sensor which may be mounted for movement with the pendulum for sensing its angular motion. A glass casing 140 supports a pair of measuring electrodes 142 and 144 and a common electrode 146 equally spaced from each of the other electrodes and holds an electrode contacting electrolyte 148 forming an air bubble 150 as shown. The casing 140, when held level at the pivot of the pendulum 40, causes the electrodes 142 and 144 to be equally immersed in the electrolyte 148 and the resistances from each electrode to the common electrode 146 will be equal. If the casing is titled, the bubble 150 will move off center and vary the degree of immersion of each electrode thus varying the relative resistances between the measuring electrodes 142, 144 and common electrode 146. Thus the electrodes 142, 144 will sense a tilt and produce an output proportional to the variation of electrical resistance between the electrodes.

In the embodiment of the invention which utilizes this electrolytic potentiometer, the potentiometer sensor replaces the "Microsyn" 34 in the circuit of FIG. 4. The 800-cycle input is connected at one terminal to the electrode 146 and at the other terminal through a pair of branching 1000-ohm resistors $R_1$, $R_2$ to the electrodes 142, 144. The output is taken across the electrodes 142, 144 by means of a transformer T. Oscillatory tilting or lateral movement of the potentiometer sensor will then modulate the 800-cycle input to an extent corresponding to the degree of tilting and hence, boring tool run-out. As will be noted, the circuit is in the form of a bridge and at no tilt the voltage output of the circuit will be of the order of 10 millivolts. The output during tilt may go as high as 10 volts.

Another device which is substituted for the sensor 34 in the circuit of FIG. 4 is shown in FIG. 8. A hollow metal sphere 154 of ½" outside diameter is suspended in an electric field formed by three supporting or sensing electrodes 156, 158 and 160, which are suitably energized by a servo controlled electric field comprised of windings 160, 162 and input source 164. The output is take-off winding 166. Torsional displacement of the supporting electrode results in essentially zero torsional coupling from electrodes to sphere. The sphere 154 responds to lateral acceleration in a manner similar to the elastic system shown in FIG. 9 wherein a mass M is mounted between springs $K_1$ and $K_2$. The equivalent circuit for the arrangement of FIG. 8 is shown in FIG. 10 where $C_1$, $C_2$ and $C_3$ represent the capacitances due to the positioning of the electrodes 156, 158 and 160 with respect to the sphere 154 and $i_1$, $i_2$ represent the respective currents as shown. As the sphere 154 moves left, $C_1$ increases and $C_2$ decreases. Current $i_1$ is greater than current $i_2$. As the sphere moves right, $C_2$ exceeds $C_1$; $i_2$ exceeds $i_1$ and the phase output at winding 166 shifts 180° producing the voltage waveshape 168 shown in FIG. 11.

A preferred type differential transformer employs two fixed windings, having a common core, contained in the stator. The magnetic flux flowing through the core depends on:

(a) The excitation to the primary, which is held constant;

(b) The reluctance of the magnetic circuit which links the secondary with the primary.

The rotor of the transformer includes a tapered piece of soft iron which provides a varying amount of soft iron for the magnetic path of the flux as the rotor moves with respect to the stator. The point here is that the primary and secondary coils do not move. The rotor controls the reluctance of the magnetic circuit and in that way determines the magnitude of the voltage which appears at the output terminals of the transformer.

The operation of the sensor of FIG. 5 may be summarized as follows: The front pendulum 114 is tuned to a torsional frequency of 1.1 cycles, i.e., well below the 2.33 frequency of rotation of the barrel. The rear pendulum 122 is tuned to 4.4 cycles but when it is connected to shaft 94 by the screws shown, then the rear pendulum 122, hollow shaft 94, and transformer stator 92 are one assembly and have a torsional frequency of 4.1 cycles per second which is well above the 2.33 c.p.s. barrel rotation frequency. As the boring tool begins to cut, the cutting load on the teeth causes it to twist erratically. When boring head 26 twists, frame 86 of the sensor also twists with it because it is firmly connected thereto. Bearings 96, 102 and 113 are initially in a state of static friction (high value of friction), but as the angle twist of the boring head increases, the natural gravitational restoring force of the pendulum causes the bearings to break away and the bearings are then moving and in a state of dynamic or low friction—as long as they are moving. The continual erratic twisting of the boring head due to cutting loads erratically but adequately stimulates the rear pendulum assemlby so that it is continually swinging back and forth at 4.1 cycles per second, carrying the transformer frame with it. This continual swinging of the rear pendulum assembly keeps both set of bearings in this state of dynamic friction. This shows up as two benefits:

(a) Negligible torsional 2.33 cycle energy comes from the boring head 26 through bearings 96 and 98 to the rear pendulum assembly, so there is no error signal due to twisting of the boring bar;

(b) Bearings 96, 98 and 113 being exceedingly free, the rear and the front pendulums are both responsive to 2.33 cycle lateral stimulus of small magnitude thus making for a sensitive sensor at the run-out frequency.

It is to be recalled that the front pendulum is tuned below the 2.33 cycles while the rear pendulum is tuned above this frequency. Therefore, their responses to this 2.33 c.p.s. frequency will be about 180° out of phase, i.e., if pendulum 114 is going clockwise, pendulum 122 is going counterclockwise. This is proper since the signal from the Microsyn transformer is the sum of the two angles. Without this 4.1 cycle continuous swinging of the rear pendulum, as a result of random pulses of energy reaching it from the boring head, the whole sensor would be insensitive and inoperative for this purpose. It is this phenomenon which wipes out most of the bearing friction and makes the sensor quite sensitive.

It is also clear that the rear pendulum assembly is swinging at two frequencies simultaneously, namely, 4.1 cycles, its natural torsional frequency, and 2.33 cycles, its forced frequency due to lateral motion of the whole sensor at the orbiting frequency.

While several embodiments of the invention have been described in detail, it should be understood that these are for purposes of illustration only and may readily be modified by one skilled in the art without departing from the spirit and scope of the invention as disclosed herein.

What is claimed is:

1. An apparatus for indicating run-out during the boring operation within a rotating object comprising means for rotating the object to be bored about a predetermined center line; a boring tool adapted to be advanced in parallel with said center line and including a cutting head for cutting the interior of the rotating object, means for mounting said boring tool in a rotationally stationary position and for advancing said boring tool axially approximately along the predetermined center line of rotation of the object, sensing means positioned proximate to said boring tool for indicating run-out of said boring tool from the predetermined center line of rotation, said sensing means including movable means mounted on said boring tool for sensing movement of the boring tool and for responding to the kinetic quantities imparted to said boring tool upon said boring tool being moved transverse to the predetermined center line, whereby upon said boring tool being subjected to run-out, the center of said boring tool orbits about the predetermined center line and imparts oscillatory motion to said movable means, and electrical means responsive to the movement of said movable means for indicating the existence and degree of run-out as determined by the kinetic quantities sensed by said movable means.

2. An apparatus as in claim 1 wherein said movable means includes a pendulum member hingedly mounted on the center line of said boring tool for vibrating in response to the orbital motion of said boring tool.

3. Apparatus as in claim 2 wherein said electrical means include a first element movable with said pendulum member and a second element stationary with respect to said pendulum member, source means for passing a current through said second element whereby movement of said elements with respect to each other produces modulation of the output of said source means.

4. An apparatus as in claim 3 wherein said first element includes one transformer winding and said second element includes a second transformer winding positioned with respect to said first transformer winding for altering the coupling between said transformer windings upon movement of said pendulum member.

5. An apparatus as in claim 3 wherein said second element includes two transformer windings and said first element includes means for varying the magnetic reluctance between said windings.

6. An apparatus as in claim 4 wherein said source means include an oscillator having a frequency output of a greater order than the frequency of rotation of the object being bored by said means for rotating the objects so as to form a carrier frequency whereby the swinging of said pendulum member modulates the output signal from said source and wherein said electrical means further include means for detecting the modulated signal from said first transformer and means for producing an indication from the detected signal corresponding to the amplitude of the motion of said pendulum means.

7. An apparatus as in claim 6 wherein said electrical means further comprise means for varying the sensitivity of said indicating means in dependence upon the axial position of said boring tool so as to indicate comparative run-out with respect to the run-out limit at any particular axial position of the boring tool.

8. An apparatus as in claim 7 wherein said indicating means includes alarm means for summoning an operator upon the signal being indicated exceeding the predetermined limit of run-out.

9. An apparatus for boring the rough forged hole of a barrel wherein the outer surface has been finished comprising: a plurality of bearings for supporting said barrel for rotation about a predetermined center line, means for rotating said barrel about said predetermined center line, a boring tool for projection into the rough forged hole of the barrel during rotation of the barrel, a pair of cutting bits on said boring tool for cutting into the interior of the rough forged hole upon said barrel being rotated and said boring tool being advanced into the rough forged hole, means for advancing said boring tool into said rough forged hole, a sensor mounted on said boring tool along the boring tool center line, means for mounting and isolating the sensor from the twisting action upon said boring tool during a cutting load, said sensor including movable means mounted along the boring tool center line for movement by said boring tool upon said boring tool running out from said predetermined center line and following an orbital path about said predetermined center line of rotation of said barrel, and means in the sensor for indicating the movement of said movable means so as to indicate existence and degree of run-out of said boring tool.

10. An apparatus as in claim 9 further comprising alarm means for actuation upon said movable means moving beyond a predetermined limit so as to indicate run-out beyond a predetermined maximum.

11. An apparatus as in claim 9 wherein said sensing means include a pair of transformer windings, means carried by said movable means for varying the magnetic reluctance between said windings whereby the coupling between said transformer windings is altered by movement of said movable means in response to the run-out of said boring tool.

12. An apparatus as in claim 9 further comprising electrical input means for producing an alternating current signal in one of the transformer windings, electrical output means for receiving a signal from the other of said windings whereby the input signal is modulated by the movement of said movable means, and output means for modulating the signal and transmitting the signal.

13. An apparatus as in claim 9 wherein said isolating means include a plurality of bearings on said boring tool, a shaft rotatably mounted in said bearings along the center of said boring tool for supporting said sensor, and a pendular member mounted on said shaft and having a natural frequency greater than the frequency at which said barrel is turned.

14. An apparatus as in claim 9 wherein said sensor includes a liquid container mounted on said movable means having electrode means extending into said container, said container being partially filled with an electrolytic solution in contact with a portion of said electrode means for varying the area of said electrode means contacted by said electrolyte with the angle of tilt of said container and electrical means connected to said electrode means and said indicating means for indicating the degree of contact of the electrolyte with said electrode means.

15. An apparatus as in claim 9 wherein said sensing means include a spherical electrode and a servo-controlled electric-field-producing circuit for suspending said spherical electrode whereby upon occurrence of run-out, lateral motion of said sphere is changed to alter the electric field in said circuit and indicating means responsive to the electric field produced by said circuit.

16. An apparatus as in claim 15 wherein said circuit comprises a plurality of capacitor-like plates spaced from the surface of said sphere, means for energizing said plates and means for responding to the change in capacitance between said sphere and said plates for indicating run-out.

17. An apparatus as in claim 9 wherein said means for indicating the movement of said movable means include an electrical source, varying means connected to said movable means for varying the output of the electrical source in response to one of the kinetic quantities associated with the movement of said movable means, filter means for selectively detecting and passing only the frequency imparted to said movable means by the rotary movement of the barrel, and means responsive to the magnitude of the output of said filter means for indicating the magnitude of the filtered signal.

18. An apparatus as in claim 17 further comprising a gain control potentiometer mechanically linked to the boring tool for providing a signal indicative of the axial position of the boring tool, means for electrically loading said potentiometer so as to produce a predetermined variation in resistance thereof upon being varied, said potentiometer being connected to the output of said filter means for regulating the gain of said filter means whereby the effect of run-out upon said indicator meter and alarm is varied with respect to the advance of said boring tool into the barrel so as to adjust the alarm to changing run-out maxima.

19. An apparatus as in claim 17 wherein said varying means include an electrolytic-liquid container movable with said pendulum member, a plurality of electrodes in said container at least partially immersed in said electrolyte, one of said electrodes being connected to said source and another to said filter means, whereby tilt of said pendulum member varies the degree of immersion of said electrodes in the electrolyte and varies the output of said source to said filter in response to the tilt of said pendulum member.

20. An apparatus as in claim 17 wherein said varying means include a pendulum mounted spherical electrode and a plurality of electric-field-producing peripherally spaced plates connected to said source and said filter means for suspending said electrode, said plates being mounted on said boring tool, whereby upon occurrence of run-out and lateral motion of said pendulum member, the position of said sphere is changed to alter the electric field.

21. A run-out detector for a boring tool for boring a workpiece comprising a frame for attachment to the tool, a first pendulum pivotally supported on said frame to swing transversely to the axis of rotation of said workpiece, a rotatable member rotatably supported from said frame, a second pendulum supported by said rotatable member and arranged to rotate therewith, said first and second pendulum members being characterized by unlike natural frequencies, and means for sensing the difference in frequency between said pendulums.

22. A run-out detector for a boring tool for boring a rotating workpiece comprising a frame for attachment to the tool, a first pendulum pivotally supported on said frame to swing transversely to the axis of rotation of said workpiece, a rotatable member rotatably supported from said frame, a second pendulum supported by said rotatable member and arranged to rotate therewith, said first and said second pendulum members being characterized by one having a natural frequency greater than the rotational speed of said workpiece and one having a natural frequency less than the rotational speed of said workpiece, and means for sensing the difference in frequency between said pendulums.

No references cited.